United States Patent [19]

Foroulis

[11] 4,405,584
[45] Sep. 20, 1983

[54] PROCESS FOR REMOVING ACIDIC GASES

[75] Inventor: Z. Andrew Foroulis, Mendham, N.J.

[73] Assignee: Exxon Research and Engineering Co., Florham Park, N.J.

[21] Appl. No.: 344,987

[22] Filed: Feb. 2, 1982

[51] Int. Cl.³ .............................................. B01D 53/34
[52] U.S. Cl. .................................... 423/228; 423/229; 423/232; 252/192; 252/387
[58] Field of Search ....................... 423/228, 229, 232; 252/192, 387

[56] References Cited

U.S. PATENT DOCUMENTS

| | | | |
|---|---|---|---|
| 2,869,978 | 1/1959 | Fischer | 23/3 |
| 3,087,778 | 4/1963 | Negra et al. | 23/3 |
| 3,311,529 | 5/1963 | Chisholm | 161/213 |
| 3,808,140 | 4/1974 | Mago et al. | 252/389 |
| 3,951,844 | 4/1976 | Mago | 252/192 |
| 3,959,170 | 5/1976 | Mago et al. | 252/189 |
| 4,132,661 | 1/1979 | Kerfoot | 252/387 |
| 4,132,667 | 1/1979 | Kerfoot | 252/387 X |
| 4,138,353 | 2/1979 | Lipinski | 252/181 |
| 4,313,837 | 2/1982 | Vukasoirch | 252/387X |

FOREIGN PATENT DOCUMENTS 49-030626 8/1974 Japan .
53-053539 5/1978 Japan .
53-053540 5/1978 Japan .
53-075139 7/1978 Japan .

OTHER PUBLICATIONS

Journal of Chemical Technology and Biotechnology, vol. 29, pp. 619–628 (1979).

Primary Examiner—Earl C. Thomas
Attorney, Agent, or Firm—Edward H. Mazer

[57] ABSTRACT

An improved method for removing acidic gases from a gas stream containing the acidic gases is disclosed in which a corrosion inhibitor comprising a mixture of salts of antimony and molybdenum is added to an amine promoted alkaline salt scrubbing solution.

22 Claims, 2 Drawing Figures

GAS TREATING UNIT FLOW DIAGRAM

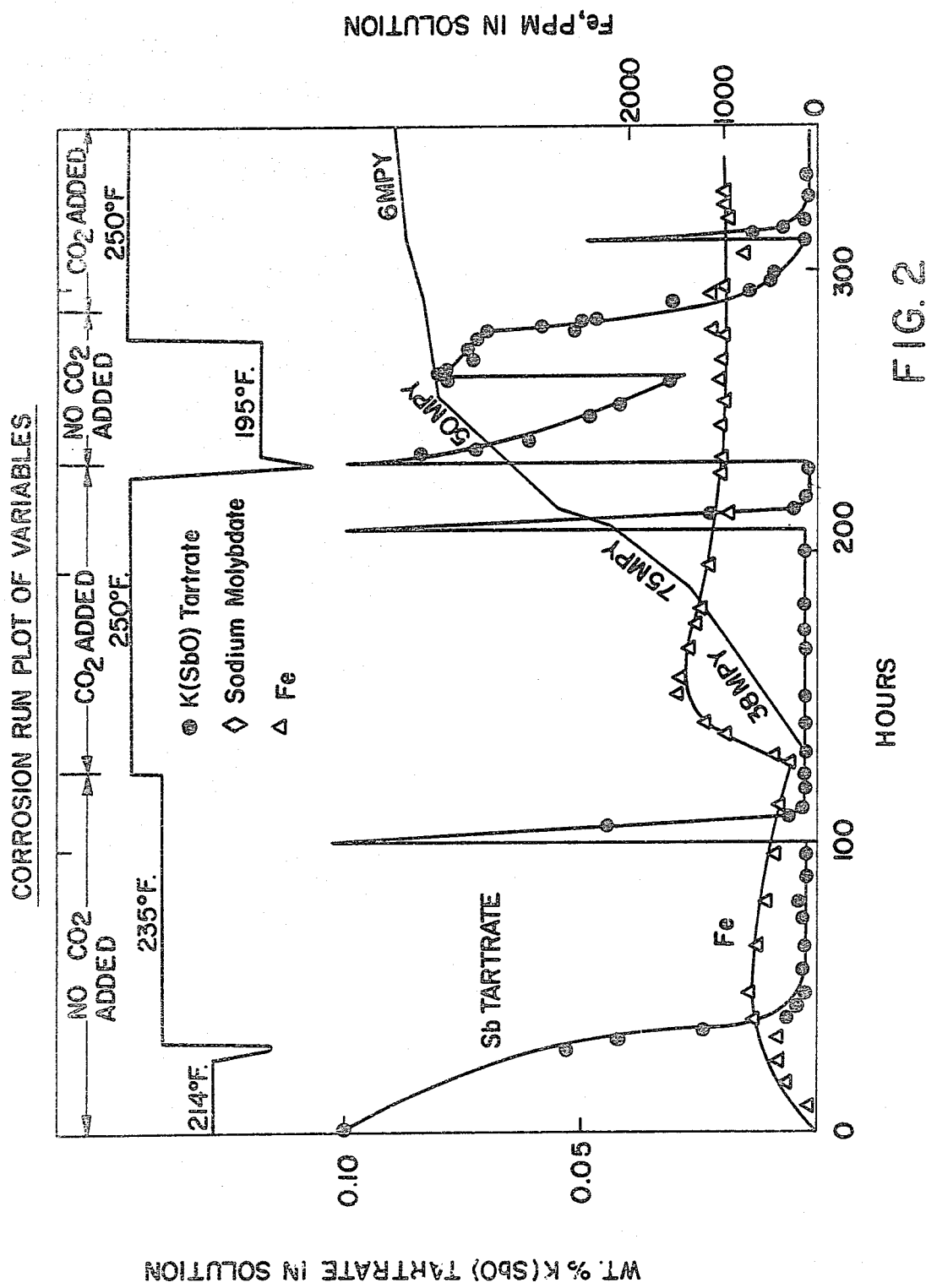

PROCESS FOR REMOVING ACIDIC GASES

BACKGROUND OF THE INVENTION

This invention is related to a corrosion inhibitor for metal surfaces. More specifically, the present invention is related to a corrosion inhibitor having particular utility in acid gas scrubbing systems.

The sweetening of natural and synthetic gases has been practiced for many years. Typically this has involved the removal of acidic compounds such as $CO_2$, $H_2S$ and COS by absorption of the acid gases in a liquid absorbent medium. Various aqueous absorbing or scrubbing solutions have been utilized to remove the acidic components including alkanolamines, sulfolane (2,3,4,5 tetrahydrothiophene-1,1 dioxide), 2,3,4,5 tetrahydrothiophene-1,1 dioxide with diisopropanol amine, and potassium carbonate solutions. Each of these systems experiences corrosion which may be attributable to one or more of the following: decomposition of the scrubbing solution; reaction of the acidic components of the gas and the absorbent; and direct attack of the acidic components in the gases. This corrosion may occur throughout the entire gas treating system contacted by scrubbing solution and acid gas. It has been found that this corrosion may be particularly severe in systems where the concentration of $H_2S$ in the inlet gas is relatively low, i.e. less than 0.3 vol.%, either because the gas source was relatively low in $H_2S$ or because previous processing had reduced the $H_2S$ content of the gas. It is believed that $H_2S$ promotes the formation of a protective sulfide coating on the exposed surfaces thereby inhibiting corrosion.

U.S. Pat. No. 3,311,529 discloses the use of a molybdate coating and a low solubility (i.e. 3-300 parts per million) antimony compound coating between dissimilar metals to inhibit galvanic activity and corrosion. The preferred antimony compound is antimony trioxide. This patent does not disclose the use of antimony compounds having high solubility and does not disclose alkali metal antimony salts. The specifically disclosed molybdates are those having a low solubility, such as barium or strontium molybdate, which can be incorporated into a paint or primer. This patent does not disclose or suggest a corrosion inhibitor having a relatively high solubility which could be added to the scrubbing solution of an acid gas treating system.

Several corrosion inhibitors have been directed at decreasing the corrosion rate of gas treating systems such as those previously described. U.S. Pat. No. 3,951,844 is directed at a corrosion inhibitor composition for ferrous metals in an acid gas treating plant utilizing an aqueous potassium carbonate scrubbing solution. The corrosion inhibitor comprises a mixture of a vanadium compound capable of ionizing in the aqueous potassium carbonate solution to provide pentavalent vanadium ions and an antimony compound which is at least partially soluble in the aqueous potassium carbonate solution. Among the preferred compounds are the antimony compounds such as alkali metal antimony tartrates, and other derivatives of polyhydroxyorganic acids, where the carboxylic acid molecules has from about two to about six carbon atoms. Specifically preferred compounds are potassium antimony tartrate and sodium antimony tartrate. Other compounds disclosed include oxides of antimony, alkali metal meta-antimonites, pyroantimonites, meta-antimonates, and antimony sulfates. U.S. Pat. No. 3,808,140 also discloses the combination of an antimony compound and a vanadium compound as a corrosion inhibitor. Preferred antimony compounds include alkali metal antimony tartrates, alkali metal antimony gluconates and other antimony derivatives of polyhydroxy organic acids. U.S. Pat. No. 3,959,170 also discloses the use of antimony and vanadium compounds as corrosion inhibitors. Preferred compounds include alkali metal tartrates. A specifically disclosed corrosion inhibitor is potassium antimony tartrate and sodium metavanadate. U.S. Pat. No. 2,869,978 also discloses the use of antimony compounds for corrosion inhibitors in acid gas systems. Aqueous sodium antimony tartrate and aqueous potassium antimony tartrate are disclosed as being effective in amine scrubbing solutions used to remove carbon dioxide and hydrogen sulfide. While vanadium compounds may be effective as corrosion inhibitors, an oxidizing agent is required to maintain the vanadium as an effective corrosion inhibitor. Frequently this is accomplished by air injection or by the use of an oxidant in the solution. In a system utilizing hindered amines, air injection or use of an oxidant might result in the oxidation of the amine activator and/or the co-solvent. This is undesirable, particularly in view of the relatively high cost of the amine activators and co-solvents. U.S. Pat. No. 3,087,778 also discloses the use of soluble compounds of antimony, arsenic, bismuth and phosphorus as corrosion inhibitors for the hot carbonate gas scrubbing process.

Japanese Pat. Nos. 5-3053-539 and 5-3053-540 both disclose the use of potassium antimony tartrate to inhibit the corrosion of steel in a scrubbing system used to remove $CO_2$ from gas. These patents also utilize aminocarboxylic acid, its alkali metal salt or an ethylene polyamine. None of the above-noted patents discloses the combination of the antimony compound with a molybdenum salt.

Molybdenum compounds also have been used as corrosion inhibitors. In the Journal of Chemical Technology and Biotechnology, Volume 29, pages 619–628 (1979) Armour and Robitaille disclose the use of sodium molybdate as a corrosion inhibitor for cooling water systems. Japanese Pat. Nos. 5-3075-139 and 7-4030-626 also disclose use of sodium molybdate as a metal corrosion inhibitor in aqueous systems. U.S. Pat. No. 4,138,353 discloses the use of molybdates with citric acid and/or its alkali metal salts for corrosion inhibitors of aqueous systems. U.S. Pat. No. 4,132,667 discloses the use of sodium zinc molybdate as a corrosion inhibiting pigment. None of these publications discloses or suggests adding an alkali metal antimony tartrate to the solution containing the molybdate.

Accordingly, it is desirable to formulate a soluble corrosion inhibitor which provides effective corrosion protection, does not promote amine degradation, and does not require the presence of oxygen or other oxidizing agents for its performance.

It also is desirable to provide a corrosion inhibitor which is compatible with the solution, does not promote foaming and which is stable at the scrubbing solution operating temperatures.

It also is desirable to provide a corrosion inhibitor which does not interfere with the mass transfer rate and the absorption ability of the scrubbing solution.

It has been found that a combination corrosion inhibitor comprising an antimony salt and a molybdenum salt exhibits improved corrosion protection while not adversely affecting the effectiveness of the scrubbing solution.

SUMMARY OF THE INVENTION

In a process for removing acidic gases from a gaseous stream containing the same, wherein said gaseous stream is contacted with an amine promoted alkaline salt scrubbing solution, the improvement comprising the combination of the scrubbing solution with an effective amount of a corrosion inhibitor comprising a mixture of salts of antimony and molybdenum. The weight ratio of the antimony salt to the molybdenum salt ranges between about 0.01:1 and about 5:1, preferably from about 0.05:1 to about 0.2:1. The antimony salt preferably comprises an alkali metal antimony tartrate, with the most preferred being potassium antimony tartrate. The molybdenum salt preferably comprises a molybdate, more preferably an alkali metal molybdate. The most preferred is sodium molybdate. The corrosion inhibitor preferably comprises between about 0.01 wt.% and about 6 wt.% of the scrubbing solution, preferably from about 0.05 wt.% to about 0.2 wt.%.

The scrubbing solution preferably comprises potassium carbonate and a sterically hindered amine. Among the preferred sterically hindered amines are N-cyclohexyl-1,2 ethanediamine (CHED), N-cyclohexyl-1,3 propanediamine (CHPD), N-cyclohexyl-1,4 butanediamine (CHBD), N-cyclohexyl-1,5 pentanediamine; secondary butylglycine (SBG) and methyl secondary butylglycine (MSBG).

BRIEF DESCRIPTION OF THE DRAWINGS

FIG. 2 is a plot of the several solution variables as a function of temperature and time.

DETAILED DESCRIPTION OF THE INVENTION

Figure 1:
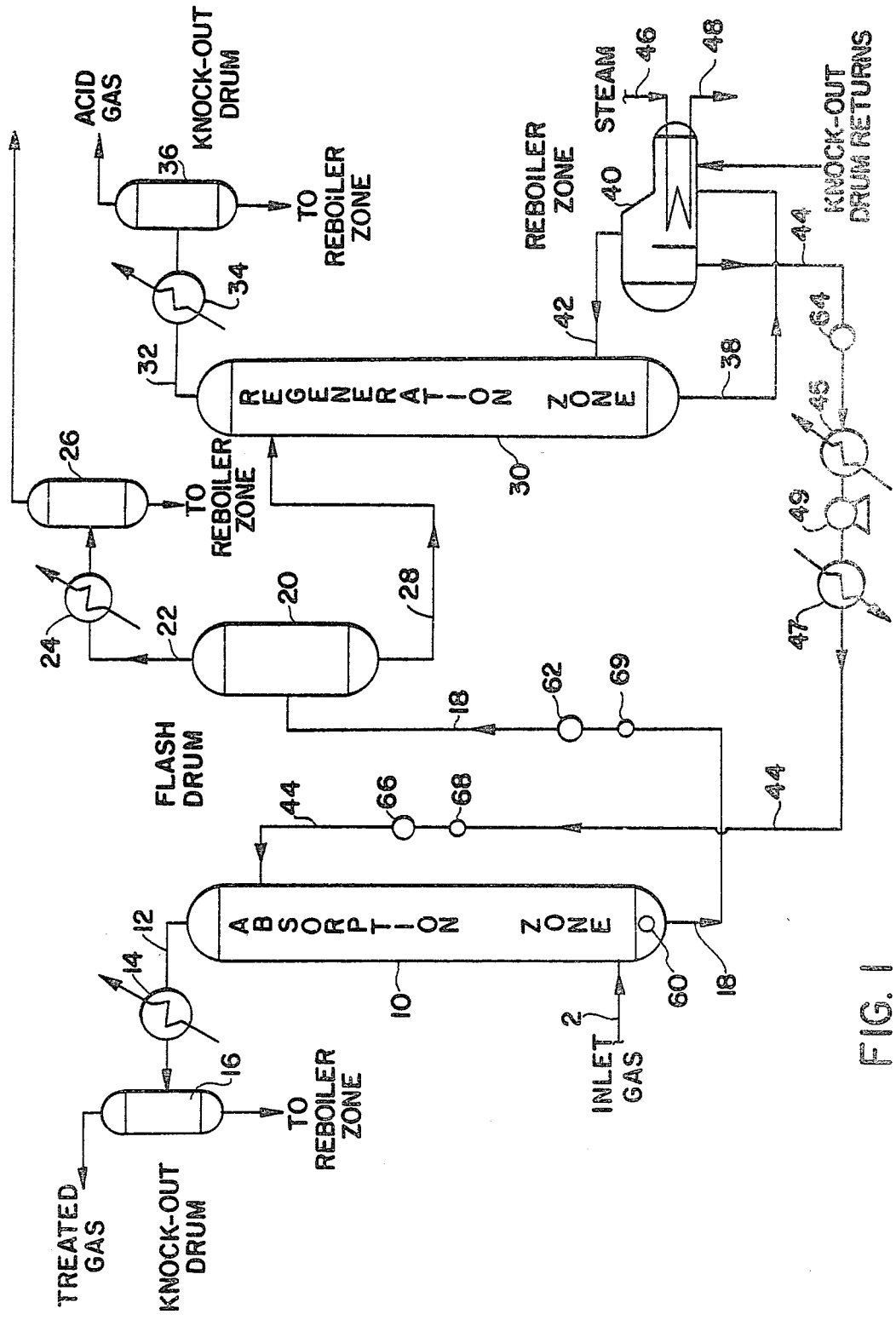
FIG. 1 is a simplified process flow diagram of a typical gas treating unit.

In the processing of gas mixtures in the oil, chemical and coal industries, acidic compounds frequently must be removed from the gas stream. As used hereinafter the term acid-containing gases includes $CO_2$ as well as $H_2S$, $SO_2$, $SO_3$, $CS_2$, HCN, COS and the oxygen and sulfur derivatives of $C_1$ to $C_4$ hydrocarbons as they frequently appear in gaseous mixtures. Except for $CO_2$ and $H_2S$, these gases normally are present only in small amounts within a gaseous mixture or feed.

While it is believed that the subject invention will have applicability to a wide variety of acid gas scrubbing solutions, the present invention is especially applicable to alkaline liquid systems, such as aqueous absorbing solution comprising an alkaline material selected from the group consisting of alkali metal salts, alkali metal hydroxides and amines. The subject invention is particularly applicable to amine promoted alkaline salt scrubbing solutions, and is more particularly applicable to sterically hindered amine scrubbing solutions. In the tests described hereinafter, the scrubbing solution comprises an aqueous solution having a basic alkali metal compound selected from the group consisting of alkali metal bicarbonates, carbonates, hydroxides, borates, phosphates and their mixtures, the alkali metal compound preferably being present as about 10 to about 40 weight percent of the entire weight of the solution. Most preferably, potassium carbonate is used in a concentration of about 20 to 35 weight percent.

The activator may have the structure:

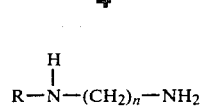

where R is a secondary or tertiary alkyl group and n is the integer 2, 3 or 4. The preferred activators are N-cyclohexyl-1, 3-propanediamine (CHPD); N-cyclohexyl-1, 2-ethanediamine (CHED); N-cyclohexyl-1, 4-butanediamine (CHBD); and N-cyclohexyl-1,5 pentanediamine. U.S. Pat. No. 4,112,050, the disclosure of which is incorporated by reference, discloses the use of an aqueous solution comprising a basic alkali metal salt or hydroxide and a sterically hindered diamine activator for removing acid gases from a gaseous mixture. Other activators, disclosed in U.S. Ser. No. 321,058, the disclosure of which is incorporated herein by reference, which may be useful in acid-gas scrubbing are activators or mixtures of activators, having the structures:

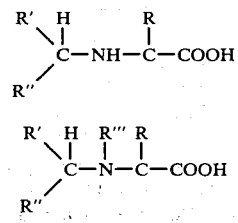

wherein R is hydrogen or methyl, and R' and R" are each selected from the group consisting of:

(a) substituted or unsubstituted, linear or branched alkyl radicals having one to twenty carbon atoms; or (b) substituted or unsubstituted alkylene radicals together having three to six carbon atoms and combined to form a cyclic ring; or (c) substituted or unsubstituted cycloalkyl radicals having from four to eight ring carbon atoms; or (d) substituted or unsubstituted hydroxyalkyl radicals, linear or branched, having from one to twenty carbon atoms; or (e) substituted or unsubstituted aralkyl radicals having from seven to twenty carbon atoms, and wherein R''' is selected from the group consisting of substituted or unsubstituted linear alkyl radicals having from one to twenty carbon atoms.

The mole ratio of the two amino acids may widely vary, but preferably ranges from 1:3 to 3:1, and more preferably about 1:1.

The preferred amino acids will be those where R is hydrogen or a methyl radical, and R' and R" are each selected from the group consisting of $C_1$–$C_6$ hydrocarbon radicals and R''' is a methyl or ethyl radical. The most preferred amino acids will be those where R is hydrogen, R' and R" are each selected from the group consisting of $C_1$–$C_3$ hydrocarbon radicals and R''' is a methyl radical. A particularly preferred mixture includes N-secondary butyl glycine (SBG) and N-secondary butyl N-methyl glycine (MSBG). A process for utilizing this latter group of activators in acid-gas scrubbing is described in U.S. Ser. No. 321,061, the disclosure of which is incorporated herein by reference.

The activators described hereinabove preferably are present in concentrations of about 0.5 to about 20 weight percent, more preferably from about 0.5 to about 15 weight percent, and most preferably from about 1 to about 10 weight percent.

It has been found that while the above-noted activators improve the working capacity of acid scrubbers over the prior art, the efficiency of certain of these absorbing solutions declines in alkaline scrubbing systems at high temperatures and at low concentrations of the acid gas in the solution due to phase separation. However, it also has been found that phase separation does not occur in absorbing or scrubbing solutions utilizing SBG or MSBG activators. Thus, a cosolvent preferably is added to all the above-noted absorbing solutions to prevent phase separation except for those utilizing SBG and MSBG. The preferred cosolvents are amino acid cosolvents, with the more preferred being amino acid cosolvents having from 4 to 8 carbon atoms. The most preferred cosolvent is pipecolinic acid (PA). The content of the amino acid cosolvent in the absorbing solution will range from about 0.5 to about 15 weight percent, with the preferred range being about 1 to about 10 weight percent.

The corrosion inhibitors which are the subject of the present invention comprise the combination of a soluble antimony salt and a soluble molybdenum salt. As used herein the term "soluble" means molecularly soluble or colloidally soluble to at least 1000 parts per million by weight in water. The molecular solubility of the preferred molybdenum salt, sodium molybdate, is at least 1 wt.% both in water and in a scrubbing solution comprising 28 wt.% $K_2CO_3$. The molecular solubility of the preferred antimony salt, potassium antimony tartrate, is at least 1 wt.% in water and 0.2 wt% in carbonate solution.

The concentration of the antimony salt in an aqueous solution may range between about 0.2 wt.% and about 5.0 wt.%, preferably between about 0.5 wt.% and about 1.0 wt.%. The concentration of the antimony salt in the scrubbing solution may be lower, due to the reduced solubility of the antimony salt when other salts are present. Typically, the concentration of antimony salt in scrubbing solution may range between about 0.005 wt.% and about 1.0 wt.%, preferably between about 0.05 wt.% and about 0.2 wt.%. The concentration of the molybdenum salt is less affected by solubility. Typically, the concentration of the molybdenum salt in an aqueous solution or in a scrubbing solution will range between about 0.001 wt.% and about 1.0 wt.%, preferably between about 0.1 wt.% and about 0.8 wt.%.

The weight ratio of the antimony salt to the molybdenum salt preferably ranges between about 0.01 to 1 and 5 to 1, more preferably from about 0.05 to 1 to about 0.2 to 1. The concentration of the corrosion inhibitor in the absorbing or scrubbing solution may range between about 0.01 wt.% and about 6.0 wt.% of the total absorbing solution, preferably between about 0.05 wt.% and about 0.02 wt.% of the total absorbing solution.

The antimony salts particularly useful in this invention are the alkali metal salts, with the more preferred being the antimony tartrates and antimony sulfates. A specifically preferred compound is potassium antimony tartrate, $K(SbO)C_4H_4O_6 \cdot \frac{1}{2}H_2O$.

The molybdenum salts particularly useful in the practice of this invention are the alkali metal molybdates, with the most preferred being sodium molybdate.

The following examples will demonstrate the effectiveness of the present corrosion inhibitor in reducing the corrosion rate below that obtainable using either the antimony salt or the molybdenum salt alone.

Batch corrosion test first were conducted to determine the effectiveness of various corrosion inhibitors in reducing corrosion. The following tests were conducted utilizing a typical absorbing solution comprising 28 wt.% potassium carbonate, 7 wt.% N-cyclohexyl-1,3 propane diamine, and 7 wt.% pipecolinic acid. Corrosion inhibitor and water comprised the remainder of the solution. The corrosion inhibitor, its concentration in the absorbing solution, and the corrosion rate are indicated below in Table I. In these 140 hour tests, 500 cc per minute of $CO_2$ was passed through the solution, which was maintained at atmospheric pressure at its boiling point of approximately 103° C.

TABLE I

MEASUREMENTS OF CORROSION RATES IN ABSORBING SOLUTION

| Corrosion Inhibitor Added to Absorbing Solution | Metal Tested | Corrosion Rate (Mils per year) |
|---|---|---|
| None | Carbon Steel | 740; 748 |
|  | Type 304 SS | 7.2 |
|  | Type 316 SS | 8.1 |
| 0.1 wt % potassium antimony tartrate | Carbon Steel | 2.5; 3.1 |
|  | Type 304 SS | 2.1 |
|  | Type 316 SS | 2.2 |
| 0.82 wt % sodium molybdate | Carbon Steel | 48, 46 |
|  | Type 304 SS | 6.4 |
|  | Type 316 SS | 7 |
| 0.1 wt % potassium antimony tartrate plus 0.82 wt % sodium molybdate | Carbon Steel | 1.8; 1.9 |
|  | Type 304 SS | 1.4 |
|  | Type 316 SS | 1.3 |

From the data in Table I it can be seen that the combination of the soluble antimony salt and the soluble molybdenum salt reduced the corrosion rate below that which could be obtained using either of these compounds alone.

Tests of corrosion inhibitors comprising an antimony salt and a molybdenum salt subsequently were conducted in a pilot plant gas treating unit (GTU) having an absorption zone, a regeneration zone and a reboiler zone.

A simplified schematic drawing of the gas treating unit is shown as FIG. 1. In this drawing, piping, equipment, instrumentation and valves not necessary for an understanding of the present invention have been omitted for clarity. In this figure, acid-containing gas enters absorption zone 10 through inlet 2 located near the base. Scrubbing, or absorbing solution enters absorption zone 10 near the top through line 44. Absorption zone 10 may be a packed, trayed or similar type column in which the upwardly flowing gas stream and the downwardly flowing scrubbing solution are effectively contacted. After the removal of at least a portion of the acidic compounds from the gas stream, the gas stream exiting absorption zone 10 passes through line 12, condenser 14 and knock-out drum 16 for further processing (not shown). The absorbing solution enriched in acidic compounds passes from the base of absorption zone 10 through line 18 into flash zone 20. Vapor passes from flash zone 20 through line 22, condenser 24 and knock-out drum 26 for further treatment (not shown). The non-vaporized absorbing solution passes from flash drum 20 through line 28 into regeneration zone 30 wherein acidic compounds are stripped from the absorbing solution, passing out of zone 30 through line 32, condenser 34, and knock-out drum 36 for further processing (not shown). Absorbing solution from the base of regeneration zone 30 passes through line 38 into reboiler zone 40. A fraction of the absorbing solution entering reboiler zone 40 is vaporized and returned to regeneration zone 30 via line 42, while the remainder is returned to absorption zone 10 by line 44 after passing through cooler 45 and heater 47 before and after pump 49, respectively. Steam or other heat transfer material enters reboiler 40 through line 46 and exits through line 48.

As used hereinafter, scrubbing solution which has been stripped of acidic compounds is termed "lean" solution, while scrubbing solution which contains a significant quantity of absorbed acidic compound is "rich" solution. For the tests described hereinafter, corrosion detection means were installed in this system. Corrosion coupons 60 were installed in the base of absorption zone 10 to measure the corrosion rate of the rich solution in absorption zone 10, while a corrosion probe and coupon assembly 62 was installed in transfer line 18 to monitor the corrosion of rich solution being transferred to regeneration zone 30. Corrosion probe and coupon assemblies 64 in the hot lean solution and 66 in the cold lean solution were installed in transfer line 44 to monitor the corrosion rate in the lean absorbing solution returned to the absorption zone. Corrosion tubing velocity sections 68, 69 were installed in lines 44, 18, respectively, to measure the effect of increased velocity on the corrosion rate in the lean and rich solutions, respectively.

Several runs were conducted to determine the effectiveness of the instant corrosion inhibitor in reducing the corrosion rate. In one series of tests shown in FIG. 2, the corrosion rate of a scrubbing solution comprising an antimony salt and a molybdenum salt was determined. In these tests the absorbing solution comprised 28 wt.% potassium carbonate, 7 wt.% CHPD, and 6 wt.% pipecolinic acid, while the corrosion inhibitor present in the solutions initially comprised 0.1% wt.% potassium antimony tartrate and 0.8 wt.% sodium molybdate. At 60° C. and with good agitation, a suspension which was believed to be undissolved potassium antimony tartrate still was present. During this test acid gas was not introduced into the gas treating unit initially. Prior to the addition of acid gas the potassium antimony tartrate concentration in the solution decreased very rapidly and became essentially zero at hour 48. Simultaneously, the iron level in the solution was increasing up to about 700 wppm. A second dose of potassium antimony tartrate equivalent to 0.1 wt.% was added to the solution at hour 108 with the solution temperature at 113° C. Solution analysis showed that the additional tartrate disappeared from the solution in about 4 hours. This rapid antimony consumption rate had been unanticipated, since twice as much antimony had been used up to this point as had been used during previous batch tests. The passivation was assumed to be complete and no additional antimony was added.

Carbon dioxide was introduced into the gas treating unit at hour 132. The lean solution to the absorption zone was maintained at about 120° C. and 20% conversion while the rich solution to the flash drum was maintained at about 120° C. and 50% conversion. During the first 80 hours after $CO_2$ addition, probe 66 showed an initial corrosion rate of approximately 40 mils per year, which later increased to 75 mils per year. The iron in the absorbing solution increased rapidly during this time and finally stabilized at around 1000 wppm. At hour 213, another dose of potassium antimony tartrate was added into the gas treating unit equivalent to 0.1 wt.%. Again the potassium antimony tartrate disappeared rapidly. From hour 236 to hour 290, $CO_2$ was cut out of the unit. During this time, the solution temperature of the lean solution to the absorption zone was lowered from approximately 120° C. to approximately 90° C. At hour 238, 0.1 wt.% of potassium antimony tartrate was added. The disappearance rate was found to be slower, but still appreciable. An additional 0.05 wt.% of potassium antimony tartrate was added at hour 266 and it was found that the disappearance rate became even lower. To determine the effect of temperature on the antimony consumption rate, the temperature of the lean solution to the absorption zone again was raised to approximately 120° C. at hour 282, with the $CO_2$ still cut out. The concentration of potassium antimony tartrate again decreased rapidly, demonstrating that temperature is a critical factor affecting antimony consumption. Later another addition of 0.05 wt.% potassium antimony tartrate added at hour 266 disappeared rapidly from the solution. During the period from hour 236 to hour 290 that the $CO_2$ had been cut out the corrosion rate had decreased from about 50 mils per year to about 10 mils per year. As $CO_2$ was again added to the unit, the corrosion rate remained at approximately 10 mils per year. At hour 314 an additional 0.05 wt.% potassium antimony tartrate was added and the corrosion rate decreased still further.

Table II also presents comparative corrosion data for scrubbing solution with and without corrosion inhibitor which was used for acid gas scrubbing. The scrubbing solution for all tests shown comprised an aqueous solution having 28 wt.% potassium carbonate, 7 wt.% N-cyclohexyl-1,3-propane diamine and 6 wt.% pipecolinic acid.

TABLE II

| Solution Temp. (°F.) | | % Conversion | | Corrosion Inhibitor Present | Lean Solution Corrosion Ratio (mils/year) | | | Rich Solution Corrosion Rates (mils/year) | | | |
|---|---|---|---|---|---|---|---|---|---|---|---|
| Lean | Rich | Lean | Rich | | Probe-66 | Coupon-66 | Vel. Tube-68 | Probe-62 | Coupon-62 | Vel. Tube-69 | Coupon Rack-60 |
| 250 | 250 | 20 | 60 | None | 372 | 208 | 444 | 312 | 267 | 272 | 86; 79 |
| 200 | 250 | 17 | 87 | None | 220 | 139 | 263 | 195 | 113 | 171 | 65; 80 |
| 250 | 250 | 20 | 60 | None | 965 | 574 | 488 | 176 | 240 | 619 | 112; 217 |
| 250 | 250 | 20 | 60 | 0.1 wt % potassium antimony tartrate and 0.8 wt % sodium molybdate | 36 | 62 | 127 | 0 | 23 | 30 | 4; 6 |

Because of the unexpected fluctuation in the potassium antimony tartrate concentration, additional tests were designed to determine if there were more effective methods of inhibiting corrosion utilizing the aforementioned corrosion inhibitor, particularly for commercial applications where the carbon steel surface area to solution volume is relatively high (i.e., greater than 5 ft.$^2$/ft.$^3$ and usually greater than 50 ft$^2$/ft$^3$). Since the solubility of the corrosion inhibitor salts, especially the antimony salt, is adversely affected by the presence of other salts, such as those of an alkaline liquid scrubbing solution, and since some components in an alkaline liquid scrubbing solution may interfere with the effectiveness of the corrosion inhibitor, a more effective method for pre-passivating of large steel surface areas such as those found in commercial-size plants, could be achieved by exposing the steel surface to an aqueous solution containing a relatively high concentration of alkali metal antimony tartrate with or without the addition of the alkali metal molybdate and without the alkaline salt, hydroxide or amine for an extended period prior to the introduction of the acid-containing gas. The concentration of the alkali metal antimony tartrate, such as potassium antimony tartrate, preferably should be added so that the concentration of the alkali metal tartrate ultimately in the solution is maintained within the range of about 0.01 about 5.0 wt.%, preferably about 0.3 to about 1.0 wt.%. The alkali metal tartrate may be added either periodically to the solution during the prepassivation process or in one large quantity. In one test, an aqueous solution initially comprising 1 wt.% potassium antimony tartrate and 0.8 wt.% sodium molybdate was utilized, while in another test an aqueous solution initially comprising 0.2 wt.% potassium antimony tartrate plus 0.8 wt.% sodium molybdate was utilized, with potassium antimony tartrate periodically added until the concentration of the potassium antimony tartrate again totalled 1 wt.% of the solution. These tests are described in more detail hereinafter. The temperature at which the pre-passivation is conducted may vary over a wide range, such as between about 20° C. and about 150° C., preferably between about 100° C. and about 120° C., most preferably at about 110° C. The pre-passivation should be conducted for an extended period of time, such that the concentration of the alkali metal tartrate in the solution at the end of the pre-passivation remains essentially constant, i.e., decreases less than 20% in 24 hours, preferably, less than 5% in 24 hours. Typically this may require between about four and about fourteen days, preferably about 7 to about 10 days. After the pre-passivation is completed the alkaline liquid scrubbing solution components normally would be added and the acid-gas introduced. Experimental runs are described hereinafter. A base run without any corrosion inhibitor first was conducted for 5 days. The process conditions utilized are tabulated in Table III. The instantaneous corrosion rate was measured by carbon steel corrosometer probes 62, 64, 66 located in the rich, hot lean and lean solutions, respectively. The rich solution, which was at about 120° C. and 90% conversion, exhibited a corrosion rate of 11 mils per year (MPY). In the lean solution, which was at about 93° C. and 20% conversion, the corrosion rate was 32 MPY initially, but accelerated to 190 MPY after 3 days of operation. In the hot lean solution, which was at about 120° C. and 20% conversion, the corrosion rate changed from 60 MPY initially to a very high rate of about 1300 MPY. The data proved that the K$_2$CO$_3$/CHPD system is indeed very corrosive and a corrosion inhibitor definitely is required. Table IV shows the corrosion rates as measured by coupons at the locations shown on FIG. 1.

TABLE III

PROCESS CONDITIONS OF CORROSION STUDY

| ABSORBER | |
|---|---|
| Height | 15 feet |
| Pressure | 200 psia |
| Lean Solution Temperature | 200° F. |
| Feed Gas Temperature | 200° F. |
| % CO$_2$ in Feed Gas | 26% |
| Solution Circulation Rate | 3 GPM |
| Feed Gas Rate | 67 SCFM |
| FLASH DRUM | |
| Pressure | 25 psia |
| Pre-flash Temperature | 250° F. |
| REGENERATOR | |
| Height | 15 feet |
| Pressure | 20 psia |
| Reboiler Steam Rate | 3.5 lb./min. |
| SOLUTION COMPOSITION | |
| K$_2$CO$_3$ | 28.0 wt. % |
| CHPD | 7.4 wt. % |
| PA | 3.0 wt. % |
| Lean Solution, conversion | 20% |
| Rich Solution, conversion | 90% |

TABLE IV

BASE CORROSION RATE MEASURED BY COUPONS WITH NO CORROSION INHIBITOR PRESENT

| Corrosion Probe | Location Description | Corrosion Rate, MPY |
|---|---|---|
| 60 | Absorber Bottom | |
| | CS | 15.7, 13.5 |
| | 304 SS | 5.4 |
| | 316 SS | 2.9 |
| 66 | Lean Solution-CS | 42 |
| 62 | Rich Solution-CS | 26 |
| 64 | Hot Lean Solution-CS Velocity Sections | 231 |
| 68 | Lean Solution | |
| | CS | 15.2 |
| | 304 SS | 7.3 |
| 69 | Rich Solution | |
| | CS | 60.7 |
| | 304 SS | 2.5 |

CS = Carbon Steel
304 SS = Type 304 Stainless Steel
316 SS = Type 316 Stainless Steel After the base run, an aqueous solution comprising 0.8 wt.% sodium molybdate, Na$_2$MoO$_4$.2H$_2$O, and 0.2 wt.% potassium antimony tartrate, K(SbO)C$_4$H$_4$O$_6$.$\frac{1}{2}$H$_2$O, was prepared, pumped into the system, and maintained at approximately 25° C. The solution was deaerated at ambient temperature for approximately 20 hours to prevent any reaction of oxygen with the inhibiting solution. During this time, the solution was circulated through the system while nitrogen was added to absorption zone 10. Following this deaeration, the temperature was raised to 110° C. It was observed that, during this period, the potassium antimony tartrate in the solution was consumed at a fairly rapid rate. At hour 20, addition of potassium antimony tartrate was commenced at a rate of 0.033 wt.% every four hours. The addition of potassium antimony tartrate was continued for four days, with the concentration of potassium antimony tartrate being built up to a level of about 0.5 wt.%, after a cumulative amount of about 1.0 wt.%, including the initial 0.2 wt.%, had been added to the system. After the addition of potassium antimony tartrate had been discontinued, solution circulation was continued for two more days while the concentration of the corrosion inhibitor in the solution was monitored. Solution analyses showed that the potassium antimony tartrate level remained constant at about 0.5 wt.%.

Throughout this passivation process, the level of sodium molybdate remained stable at around 0.7 wt.%. No corrosion was indicated on the corrosion probes. The iron level in the solution increased from zero to about 75 WPPM over the passivation period. It is believed that this iron was displaced by antimony from the surface of the carbon steel. Since the concentration of the corrosion inhibitor in the system had remained stable for two days, the passivation was considered complete.

The final scrubbing solution then was prepared by adding potassium carbonate, N-cyclohexyl-1,3 propanediamine (CHPD), and pipecolinic acid (PA) into the circulating water which included the corrosion inhibitor. The solution composition was adjusted to contain 28 wt.% potassium carbonate, 7.4 wt.% CHPD and 3 wt.% pipecolinic acid. The solution entering absorber 10 was adjusted slowly to about 93° C., and the solution leaving the absorber was maintained at about 120° C. It was observed that when the final scrubbing solution was prepared, the concentration of potassium antimony tartrate declined from about 0.5 wt.% to about 0.15 wt.% presumably due to the solubility limit of antimony in the solution. The concentration of sodium molybdate during the corrosion tests remained at about 0.7 wt.%. Eventually the potassium antimony tartrate concentration stabilized at about 0.12 wt.%. Carbon dioxide was then introduced gradually into the feed gas entering through line 2. The instantaneous corrosion rate was measured by corrosometer probes 62, 64, and 66 located in the rich, hot lean and lean solutions, respectively. Lean solution corrosometer probe 66 corroded at a rate of about 3 mils per year, but the corrosion rate gradually leveled off to an insignificant level. In the hot lean solution the corrosion rate of probe 64 initially was about 4 mils per year for the first 10 days at which time the probe malfunctioned. The probe was replaced and showed essentially no corrosion. The negligible corrosion rate of replacement probe 64 demonstrates that a small amount of carbon steel surface area can be passivated while the system operates without the need for repeating the passivation process. The corrosion rate for probe 62 in the rich solution showed a negative corrosion rate, indicating an increase in the thickness of the wire. This is believed to have been attributable to antimony or iron coating this probe. Coupons exposed in the solution at the previously described locations provided an independent source of corrosion measurement data which confirmed very low corrosion rates.

The coupon support in the hot lean solution in line 44 was designed to hold four coupons 64. During the tests, coupons 64 were removed periodically from the unit and replaced with new, unpassivated coupons. The data showed that initially there was a small amount of corrosion in the solution with corrosion inhibitor, but that this leveled off very rapidly. This data also showed that previously unpassivated coupons become protected against corrosion very rapidly. In contrast, it was noted that there was significant corrosion in the test in which there had been no corrosion inhibitor present.

Pre-passivation tests also were conducted in which 1.0 wt.% potassium antimony tartrate and 0.8 wt.% sodium molybdate initially were added to the aqueous solution. During passivation the solution was maintained at 110° C. and tests were run for seven days. Following pre-passivation, corrosion tests were carried out which also showed that this solution provided adequate corrosion protection.

A comparison of corrosion rates for corrosion coupons located in the lean and rich solution are presented in Table V for scrubbing solution without any corrosion inhibitor; with corrosion inhibitor added, but with no pre-passivation; and with corrosion inhibitor and pre-passivation. From this table, it may be seen that the combination of an alkali metal antimony tartrate and an alkali metal molybdate effects a significant reduction in the scrubbing solution corrosion rate when compared to uninhibited scrubbing solution. Utilization of any of the pre-passivation scrubbing procedures previously described results in a still lower rate of corrosion.

In the process in which the pre-passivation was conducted in a non-corrosive aqueous solution, the corrosion protection coating was able to build up uniformly in thickness to a coating comprising one thick layer. By contrast, in tests in which the corrosion inhibitor, scrubbing solution and acid gas were introduced substantially simultaneously to the gas treating system the corrosion layer produced was a loose multi-layer coating of iron and antimony which would not be as effective or durable. Electron probe analysis across the walls of Pall rings utilized in the corrosion tests confirmed that the pre-passivation procedure produced a superior coating.

Tests also were conducted to determine if the corrosion inhibitor would affect adversely the foaming, flooding, degradation rates, volatility and/or process performance of the absorbing solution. It was found in comparative tests that the corrosion inhibitor did not have any adverse effects on foaming or flooding in the system.

It is known that N-cyclohexyl-1,3 propane diamine degrades to form a cyclic urea. U.S. Pat. Nos. 4,180,548, and 4,292,286 have been directed at methods to remove this degradation product from the system while U.S. Pat. Nos. 4,282,193 and 4,282,194 have been directed at methods of reconverting the cyclic urea back to the corresponding diamine. Measurements were made on the rate of formation of cyclic urea in absorbing solution with and without corrosion inhibitor. It was determined that the corrosion inhibitor had no adverse effect on the formation of cyclic urea. It also was determined that this inhibitor had no significant effect on the mass transfer rate or solution capacity.

From the aforementioned it can be seen that the corrosion inhibitor disclosed herein provides effective corrosion protection while not adversely affecting any of the key operating parameters.

While this invention has been described in connection with specific embodiments, it will be understood that this invention is capable of further modification, and that this disclosure is intended to cover any variations, uses or adaptations of the invention including such departures from the present disclosure as come within known or customary practice in the art to which this invention pertains and as may be applied to the essential features hereinbefore set forth, and as fall within the scope of the invention.

TABLE V

| | COMPARATIVE COUPON CORROSION RATES (Mils/yr) | | |
|---|---|---|---|
| Coupon Probe No. | No Corrosion Inhibitor No Pre-Passivation | 0.5 wt. % Potassium Antimony Tartrate (PAT) 0.8 wt. % Sodium Molybdate (SM) No Pre-Passivation | 1.0 wt. % Potassium Antimony Tartrate (PAT) 0.8 wt. % Sodium Molybdate (SM) Pre-Passivation |
| | | 0.1 wt % PAT and 0.8 wt % SM initially added to alkaline liquid scrubbing solution. Remainder of PAT incrementally added. | 0.2 wt % PAT and 0.8 wt % SM initially added to water. Remainder of PAT incrementally added. |
| Rich | 267 | 14.1 | 2.1 |
| Lean | 208 | — | 3.8 |
| Hot Lean | 231 | 38.6 | 2.4 |

What is claimed is:

1. In a process for removing acidic gases from a gaseous stream containing the same, wherein said gaseous stream is contacted with an amine promoted alkaline salt scrubbing solution, the improvement comprising the combination of the scrubbing solution with an effective amount of a corrosion inhibitor comprising a mixture of salts of antimony and molybdenum.

2. The process of claim 1 wherein the weight ratio of the antimony salt to the molybdenum salt ranges between about 0.01:1 and about 5:1.

3. The process of claim 2 wherein the weight ratio of the antimony salt to the molybdenum salt ranges between about 0.05:1 and about 0.2:1.

4. The process of claim 2 wherein the antimony salt comprises an alkali metal antimony salt.

5. The process of claim 4 wherein the alkali metal antimony salt is selected from the group consisting of tartrates and sulfates.

6. The process of claim 5 wherein the molybdenum salt comprises an alkali metal molybdenum salt.

7. The process of claim 6 wherein the alkali metal molybdenum salt comprises an alkali metal molybdate.

8. The process of claim 7 wherein the corrosion inhibitor comprises about 0.01 wt.% to about 6 wt.% of the scrubbing solution.

9. The process of claim 8 wherein the corrosion inhibitor comprises about 0.05 to about 0.2 wt% of the scrubbing solution.

10. The process of claim 8 wherein the amine promoted alkaline salt scrubbing solution comprises potassium carbonate.

11. The process of claim 8 wherein the scrubbing solution further comprises a sterically hindered amine.

12. The process of claim 10 wherein the alkali metal antimony salt is potassium antimony tartrate.

13. The process of claim 10 wherein the alkali metal molybdate is sodium molybdate.

14. The process of claim 11 wherein the sterically hindered amine has the general formula

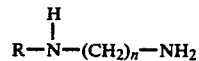

where R is a secondary or tertiary alkyl group and n is the integer 2, 3 or 4.

15. The process of claim 14 wherein the sterically hindered amine is a sterically hindered diamine selected from the group consisting of N-cyclohexyl-1, 2-ethanediamine; N-cyclohexyl-1, 3-propanediamine; N-cyclohexyl-1, 4-butanediamine; and N-cyclohexyl-1,5 pentanediamine.

16. The process of claim 15 wherein the absorbing solution further comprises a cosolvent.

17. The process of claim 16 wherein the diamine is N-cyclohexyl-1,3 propanediamine and the absorbing solution additionally contains an amino acid cosolvent containing 4–8 carbon atoms.

18. The process of claim 17 wherein the cosolvent is pipecolinic acid.

19. The process of claim 11 wherein the sterically hindered amine is selected from the group of sterically hindered amines having the structures:

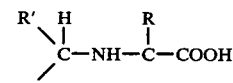

and

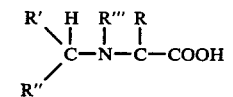

wherein R is hydrogen or methyl, and R' and R" are each selected from the group consisting of:
(a) substituted or unsubstituted, linear or branched alkyl radicals having one to twenty carbon atoms; or
(b) substituted or unsubstituted alkylene radicals together having three to six carbon atoms and combined to form a cyclic ring; or
(c) substituted or unsubstituted cyclo-alkyl radicals having from four to eight ring carbon atoms; or
(d) substituted or unsubstituted hydroxy-alkyl radicals, linear or branched, having from one to twenty carbon atoms; or
(e) substituted or unsubstituted aralkyl radicals having from seven to twenty carbon atoms, and
wherein R''' is selected from the group consisting of substituted and unsubstituted linear alkyl radicals having from one to twenty carbon atoms.

20. The process of claim 19 wherein R is hydrogen, R' and R" are each selected from the group consisting of $C_1$–$C_3$ hydrocarbon radicals, and R''' is a methyl radical.

21. The process of claim 20 wherein the sterically hindered amine is selected from the group consisting of N-secondary butyl glycine, N-secondary butyl N-methyl glycine, and mixtures thereof.

22. In a process for removing acidic gases from a gaseous stream containing the same wherein said gaseous stream is contacted with a sterically hindered amine promoted potassium carbonate scrubbing solution, the improvement comprising the combination of the scrubbing solution with about 0.01 wt.% to about 6 wt.% of a corrosion inhibitor comprising a mixture of potassium antimony tartrate and sodium molybdate.

* * * * *